Patented Nov. 28, 1944

2,364,041

UNITED STATES PATENT OFFICE 2,364,041

PROCESS OF PREPARING MUSK MATERIALS AND PRODUCT THEREOF

Philip Greeley Stevens, New Haven, Conn., and Julius L. E. Erickson, Baton Rouge, La., assignors to Burton T. Bush, Inc., New York, N. Y., a corporation of New Jersey No Drawing. Application January 5, 1942, Serial No. 425,696

6 Claims. (Cl. 260—586)

This invention relates to the preparation of a substance having a musk odor from the scent glands of the muskrat (Ondatra zibethicus).

We have found that the scent glands of the muskrat yield a material having a musk-like odor, but this is present in such small proportion (around one-tenth per cent) that commercial recovery of the odoriferous material is not economic. This odorous material appears as a mixture of two high-carbon cyclic ketones, namely, cyclopentadecanone (exaltone) and cycloheptadecanone (dihydro-civetone). After removal of this small percentage of ketones, the residual material is essentially odorless.

The glands usually average around 1¼ to 1½ grams each, are very oily, but permit extraction with petroleum ether, ether, and other solvents of fats. The extracted material, after evaporation of the solvent, is essentially a mixture of fats and complex esters containing very small amounts of the musk substance. As much as 40 per cent of an oil can thus be extracted from the dried glands.

It has now been found that the unsaponifiable portion of this material may be worked up to eliminate substantially all components except high-boiling, high-carbon cyclic alcohols, and these may then be subjected to a dehydrogenation for obtaining the corresponding ketones. It is preferred to accomplish this separation and ketonization while a mixture of such alcohols is present, as thereby is obtained a material which consists of a blend of high-carbon cyclic ketones having a powerful musk odor, and in economically advantageous yields.

Example I

The glands are removed and stored in alcohol, to prevent decomposition. The glands have a characteristic but not unpleasant musky odor. They are drained from the alcohol, and ground up, for example, in a meat chopper, wherewith a considerable quantity of a yellow, oily liquid is expressed and may be collected. The ground glands are extracted continuously with ether in a Soxhlet extractor, and the extract, the preserving alcohol, and the expressed juices are combined and evaporated to a small volume. If any disagreeable odor appears, this can be eliminated by treatment with steam for a short time. The residue is saponified with an excess of 10 per cent potassium hydroxide in boiling alcohol, with refluxing. The fats and complex esters are thereby saponified and the fatty acids are neutralized. After saponification, the liquid is distilled, preferably under reduced pressure, until most of the alcohol has been removed. The residue is poured into a large volume of water, and separated into acid and neutral fractions by extraction with ether, benzene, or another suitable water-immiscible organic solvent. The water solubles comprise the salts of the saponified acids, while unsaponifiables are largely carried by the ether layer. Upon evaporation of this ether layer, a neutral musk oil of fine fragrance is obtained. One thousand original fresh glands, weighing 1340 grams, yielded about 90 grams of this musk oil.

Distillation of this material at 1 mm. pressure yielded 30 grams of a light yellow oil, with boiling point 130–170 degrees C., which solidified on cooling to a waxy substance. The residue yielded no further volatile material even at very low pressures. The yield of the distilled musk oil was about 2.2 per cent of the weight of the fresh glands and 33 per cent of the weight of the unsaponifiable substances. This crude musk material consists essentially of cyclopentadecanol and cycloheptadecanol, with very small quantities of the corresponding ketones.

The mixture of alcohols thus obtained may be transformed into ketones by utilizing the general methods of converting alcohols into ketones, such as oxidation with chromic acid, oxidation by oxygen in the presence of silver, or catalytic dehydrogenation by passing the alcohols at a high temperature over nickel, copper, or platinum, or other suitable dehydrogenation catalysts: these various processes may be called dehydrogenating operations as they serve to eliminate hydrogen from the alcohols for forming the ketone. Thus, the cyclopentadecanol and cycloheptadecanol present in the fraction of neutral musk oil may be converted into ketones which are identical with the ketones occurring naturally in the neutral musk oil, thus rendering the dehydrogenated musk oil fraction essentially a simple mixture of the two ketones, cyclopentadecanone (boiling at 120 degrees C. at 0.3 mm. pressure, and melting at 63 degrees C.) and cycloheptadecanone (boiling at 145 degrees at 0.3 mm., and 189 degrees at 11 mm. pressure, and melting at 63 to 64 degrees C.). The mixture of ketones may be purified by transforming them into their ketone semicarbazones. Any part of the alcohols remaining unchanged throughout the oxidation process can be recovered by extraction with petroleum ether, and subjected to oxidation again. The ketones may be recovered as a mixture of cyclopentadecanone and cycloheptadecanone from their semicarbazones by treatment with acids in any conventional manner, and if desired the mixture may be separated by fractional distillation into its components.

Cyclopentadecanone (nor-muscone, or exaltone) has an odor and properties like that of its naturally occurring homolog, 3-methyl-cyclopentadecanone (muscone), which is obtained from, and is the essential odoriferous principle of, the musk of the musk deer.

Cycloheptadecanone (dihydro-civetone) has an odor and properties like that of civetone (cycloheptadecanone), which is the essential odoriferous principle of natural civet.

The ketones obtained from the scent glands of the muskrat, either separately or as a mixture, may therefore be used as a perfume, or admixed with other perfumes, in complete substitution for the natural animal products, musk and civet.

The neutral musk oil from the ether extract is then distilled under reduced pressure and that fraction of musk oil boiling between 130 to 170 degrees C. at 1 mm. pressure is collected. This fraction consists essentially of the alcohols, cyclopentadecanol and cycloheptadecanol, and also very small quantities of the ketones, cyclopentadecanone and cycloheptadecanone, and may therefore be oxidized by the use of processes commonly employed for the conversion of alcohols into ketones, such as oxidation by chromic acid or potassium dichromate, preferably using a non-homogeneous mixture of solvents, such as benzene and dilute sulphuric acid, or by oxidation with the calculated quantity of chromic acid in acetic acid solution.

Example II

After treating the crude muskrat musk with an alcoholic solution of an alkali metal hydroxide according to Example I, addition of an excess of a concentrated solution of calcium chloride precipitates the fatty acids in the form of calcium salts, which are collected by filtration, and extracted with alcohol (or another suitable solvent). Evaporation of the alcohol yields a residue from which the neutral musk oil is removed by extraction with ether or benzene, and then treated as in Example I.

Example III

The small quantity of ketones present in the musk oil fraction obtained according to Example I may be removed quantitatively prior to the dehydrogenation process by adding semi-carbazide and converting them into ketone semi-carbazones. The alcohols may be recovered from the semicarbazones by digestion and extraction with petroleum ether, separated by fractional distillation, and subsequently oxidized separately, or preferably they may be oxidized to a mixture of ketones prior to separation by fractionation.

Example IV

A sample of neutral musk oil obtained according to Example I is first analyzed to determine the content of cyclopentadecanol and of cycloheptadecanol. The neutral musk oil is then oxidized directly, prior to distillation, with approximately the theoretical quantity of chromic acid necessary to convert the alcohols present into ketones.

Example V

The neutral musk oil fraction obtained according to Example I is passed over copper heated to about 250 degrees C., preferably under reduced pressure. The alcohols contained in this fraction are thereby dehydrogenated and converted into their corresponding ketones, thus, rendering the musk oil fraction essentially a simple mixture of the two ketones, cyclopentadecanone and cycloheptadecanone, which may then, if desired, be separated by fractional distillation.

Example VI

The neutral musk oil fraction obtained according to Example I is passed over platinum heated to about 250 degrees C., preferably under reduced pressure, and the ketone mixture obtained may then be separated if desired by fractional distillation.

Example VII

The neutral musk oil fraction obtained according to Example I is passed over silver heated to about 300 degrees C. under reduced pressure in the presence of oxygen, and the ketone mixture obtained may then be separated if desired by fractional distillation.

The following data indicate the temperature and treatment conditions which may be observed in effecting separations of the ketones and alcohols of the musk oil, and of the ketone mixtures obtained by dehydrogenation operations.

On re-distillation at one mm. pressure, the distilled musk oil boiled at 130–150 degrees C. The fraction boiling between 139 and 144 degrees C. was collected and found to have a melting point of 59 to 62.5 degrees C., a fine musk odor, and on analysis was found to be a carbinol material which gave values corresponding fairly to the formula $C_{16}H_{32}O$. This fraction was saturated to bromine, contained neither nitrogen nor methoxyl and formed no semicarbazone. It has a specific optical rotation in ether of +1.7 degrees which may be ascribed to closely similar chemical compounds which could not be readily separated or identified: structurally dihydro-civetol and exaltol should have no optical activity. This fraction appears to consist essentially of one or more high-carbon alcohols each in the form of a ring compound with a high number of carbon members. On oxidation with chromic acid, the carbinol material was dehydrogenated and yielded a solid ketone material with a fine musk odor. On conversion to the ketone semicarbazone, this melted at 178–180 degrees C.

The musk carbinol boiled over a wide range, and did not melt sharply. Owing to inability to purify by crystallization, it was converted to the phthalate to remove impurities and permit an accurate analysis; but on regeneration, the carbinol still boiled over a range, and had virtually the same specific optical rotation (+1.4 degrees in ether) as it did before purification. It was further sought to purify the ketone semicarbazone but, although the latter crystallized well, it melted no more sharply than 178–180 degrees C. even after thirteen recrystallizations from three different solvents; and on regeneration, the ketone boiled over a range. The musk carbinol is therefore a mixture of carbinols; and the ketone produced therefrom is a mixture of ketones.

The musk carbinol mixture was fractionally distilled and separated into four fractions and a residue, with fraction (2) having a boiling point of 134–143 degrees C. at 1 mm. forming 25 parts, and fraction (4) at 152–155 degrees C. at one mm. forming 40 parts, with a residue of 2 parts from a total amount of distillates and residue comprising 73.5 parts. The fraction (4) was re-distilled until boiling point 155 degrees C. was reached at one mm., and then the residue was further distilled to obtain a substance (A) having a boiling point at 155 to 157 degrees C., with a weak but definite musk odor. This material (A) was treated with semi-carbazide to remove ketones, and the purified carbinol now had no musk odor and melted at 73 to 75 degrees C. On analysis, it indicated a composition of $C_{17}H_{34}O$, and upon oxidation with chromic acid yielded a ketone with melting point 58 to 61 degrees C. and having a semi-carbazone which melted at 188.5 to 189.5 degrees C. The semicarbazone material separated during the purification gave a ketone semi-carbazone which melted at 187 to 189 degrees C. Individual admixtures of the ketone and its semicarbazone with previously identified specimens of dihydrocivetone and its semicarbazone, respectively, gave no depression of the melting points.

Upon joining fractions (1) and (2), and re-fractionating at 1 mm., there was a small forerun around 125 degrees, while the main fraction (B) came over at 136.6 to 138.2 degrees C. and had a melting point of 72 to 75 degrees. The forerun had a fine musk odor, and remained liquid until chilled, but could not be identified as muscone, as its semicarbazone melted at 186-187 degrees C., whereas the muscone semicarbazone melts at 140-141 degrees C.

The main fraction (B) had a musk odor and was treated with semicarbazide, yielding a ketone-free carbinol with melting point 77 to 78 degrees C. and having no musk odor. On oxidation, this carbinol yielded a ketone which had a fine musk odor and gave a semi-carbazone melting at 185 to 186 degrees C. When mixed with the semicarbazone made from the forerun, the mixture melted at 186 to 187 degrees C., indicating that the ketone prepared from the main fraction was identical with the naturally-occurring ketone in the forerun. Upon regeneration from the semicarbazone, the ketone melted at 55 to 58 degrees C. The ketone was exaltone or cyclopentadecanone.

The mixture of the two high-cyclic ketones obtained by dehydrogenation of the cyclic alcohols in the neutral musk oil have an advantage over either alone, as their complementary effects permit advantageous direct employment without separation from one another. Further, the presence of other chemically-related optically active bodies, distinguished these products from a simple mixture of the two principal constituents, and these bodies likewise have advantage in employment of the mixture.

It is obvious that the invention is not limited solely to the practice set forth in detail above, but may be modified in many ways within the scope of the appended claims.

We claim:

1. The process of preparing a cyclic ketone material having odoriferous properties, which comprises extracting the musk glands of the muskrat with an organic solvent, saponifying the extracted material, selectively dissolving the product in mixed aqueous and water-immiscible organic solvents and separating the solvent layers, and effecting dehydrogenation of high cyclic alcohols contained in the organic solvent layer.

2. The process of preparing a cyclic ketone material having odoriferous properties, which comprises extracting the musk glands of the muskrat with an organic solvent, saponifying the extracted material, selectively dissolving the product in mixed aqueous and water-immiscible organic solvents and separating the solvent layers, eliminating the solvent from the organic solvent layer and fractionally distilling the solute in vacuo, collecting the fraction boiling between 130 and 170 degrees C. at 1 mm., and effecting dehydrogenation of high cyclic alcohols therein.

3. The process of preparing a mixture of cyclic ketones having odoriferous properties, which comprises extracting the musk glands of the muskrat with an organic solvent, saponifying the extracted material, adding a concentrated aqueous solution of an alkaline earth salt, separating the precipitate and extracting with a solvent for alcohols, evaporating the solvent and extracting the solute with an organic solvent immiscible with water, and effecting dehydrogenation of the high cyclic alcohols contained in said latter extract.

4. An odoriferous material comprising a substance having a musk-like odor and being an optically-active mixture composed mainly of cyclic ketones, said mixture having a boiling range of substantially 125° to 145° C. at a pressure of one millimeter of mercury and being obtained by saponifying the liquid fat and complex esters contained in the scent glands of the muskrat and effecting dehydrogenation of the high cyclic alcohols contained in the non-saponifiable portion.

5. The process of preparing a cyclic ketone material having odoriferous properties, which comprises extracting the musk glands of the muskrat with an organic solvent, saponifying the extracted material, removing the saponified portion, and effecting dehydrogenation of the high cyclic alcohol contained in the non-saponifiable portion.

6. The process of preparing a cyclic ketone material having odoriferous properties, which comprises saponifying the liquid fat and complex esters contained in the scent glands of the muskrat and effecting dehydrogenation of the high cyclic alcohol contained in the non-saponifiable portion.

PHILIP GREELEY STEVENS.
JULIUS L. E. ERICKSON.